May 6, 1958 — N. G. JANNES — 2,833,074
POP-UP DISPLAY
Filed Aug. 10, 1955 — 2 Sheets-Sheet 1
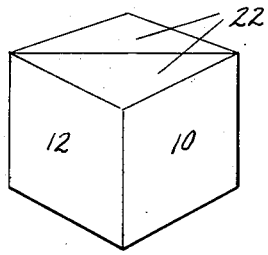
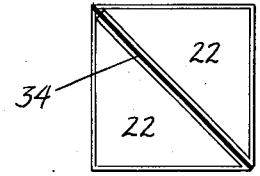
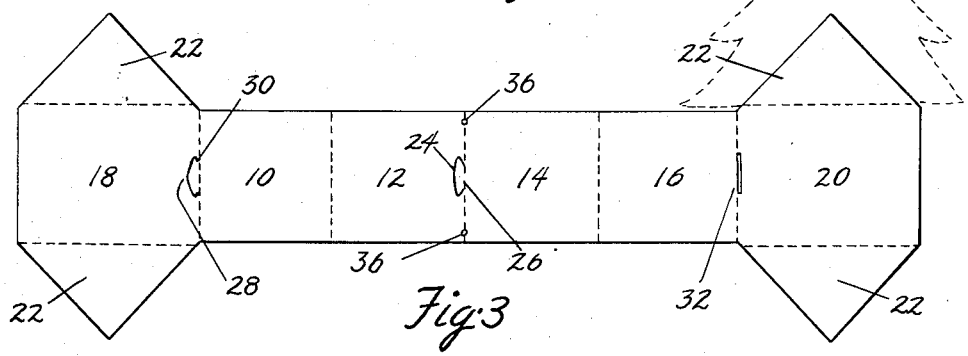
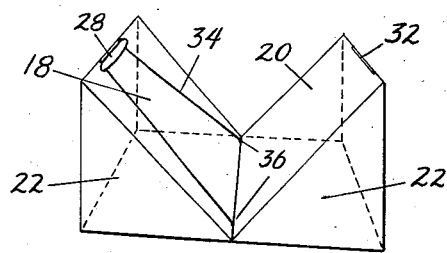
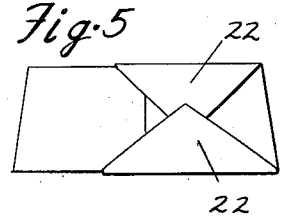
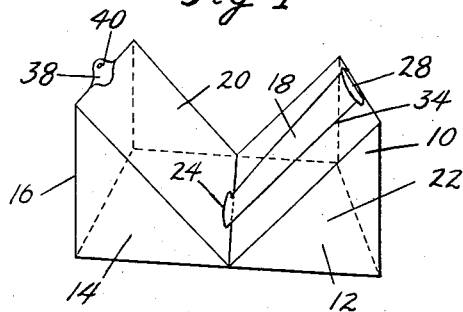
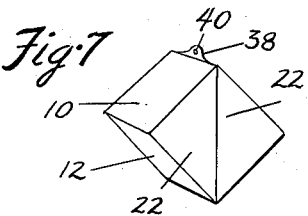
NICHOLAS G. JANNES
INVENTOR:
BY Kent W. Wonnell
Atty.

May 6, 1958 N. G. JANNES 2,833,074
POP-UP DISPLAY

Filed Aug. 10, 1955 2 Sheets-Sheet 2

NICHOLAS G. JANNES
INVENTOR:

BY Kent W. Wonnell
Atty.

United States Patent Office 2,833,074
Patented May 6, 1958

2,833,074
POP-UP DISPLAY
Nicholas G. Jannes, Chicago, Ill.

Application August 10, 1955, Serial No. 527,570

10 Claims. (Cl. 41—11)

This invention relates in general to a display which may be made in various shapes and forms for advertising purposes, for ornaments, and for showing various slogans, greetings, and the like, in a resiliently expanded form which takes its shape when released from confinement such as in a mailing or containing envelope.

An important object of the invention is to provide a new and improved pop-up display which may be cut or prepared upon a single sheet of material and equipped with an elastic projector which causes the display to be extended automatically from a flat folded condition to an expanded hollow receptacle formed as soon as the restraint of holding it in folded position is removed.

A further object of the invention is to provide a display of this kind which may be inserted in an ordinary mailing envelope and which will spring outwardly into the display form as soon as taken from the envelope.

A further object of the invention is to provide a display in which an elastic extending means such as a rubber band is so connected to the parts forming the display that it will be distended a predetermined amount and no more by the operation of the power means.

Still a further object of the invention is to provide a transverse partition plate forming an abutment against which a resilient power element operates to limit the extending movement of the display.

Still a further object of the invention is to provide a display usually cut from one piece of material so that the exposed surface is at one side of the material and the entire surface can be printed or ornamented from one side thereof.

Still a further object of the invention is to provide a display of a basic character which is easily changed by relatively simple design, additions and variations to produce resultant structures of different shapes and capable of illustrating articles of different forms, but still having a transverse or diagonal support and an elastic power means for extending connected pieces against the diagonal support.

A still further object of the invention is to provide a folding display cut, scored and foldable from a single piece of flexible sheet material such as cardboard in which the movable parts are connected by the elastic power means without the necessity of adhesive or stapled connections.

Other objects of the invention will appear in the specification and will be apparent from the accompanying drawing, in which, Fig. 1 is a perspective view of a cubicle display in accordance with this invention.

Fig. 2 is a top view of the display shown in Fig. 1.

Fig. 3 is an expanded flat view showing a blank of material in which the display of Fig. 1 is produced.

Fig. 4 is a perspective view showing the means of connecting the display blank and applying a rubber band thereto.

Fig. 5 is a perspective view of a folded display as shown in Figs. 1–3.

Fig. 6 is a perspective view of a modification of the display of Fig. 1 in open position as in Fig. 4.

Fig. 7 is a perspective view of the display as shown in Fig. 6 in expanded or extended form.

Figure 8:
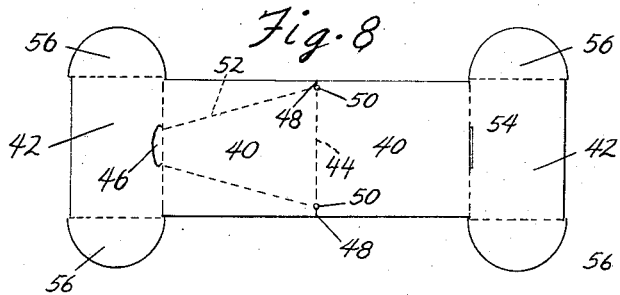
Fig. 8 shows a blank for producing a circuited display of Fig. 9.

One of the great advantages of the present invention is that it relates to a structure which is readily connected after suitable cutting, scoring and folding to apply one end of an ordinary commercial rubber band thereto, to partially fold the display and to connect the other end of the rubber band in a proper cut or projection so that no other fastening means are necessary either to secure the parts of the display together nor to produce the desired extension of the display when it is released from a folded condition.

Referring now more particularly to the drawing, a somewhat basic form of the invention is shown in Figs. 1–4 comprising a sheet of flexible material such as cardboard, thin metal, plastic, and the like, which is cut, scored and folded to provide four substantially similar side plates 10, 12, 14 and 16 all hinged together in succession. At the outer ends of plates 10 and 16 are diagonal plates 18 and 20 each provided with triangular foldable end pieces 22.

In one of the central plates 12, a rounded tongue 24 is cut from the material with a short reduced neck 26 terminating in the fold line between the plates 12 and 14. In the diagonal plate 18, a similar rounded tongue 28 is cut from the material of the plate and connected by a reduced neck 30 to the plate 10 at the fold line between these two plates.

In the plate 16 adjacent its fold line with the diagonal plate 20 is a thin slot 32 sufficient in width to receive the tongue 28 in folding and assembling the display.

In order to assemble a display, an ordinary commercial rubber band 34 of the required length and strength has one end hooked over the tongue 24 by engaging the neck thereof and when the diagonal plates 20 are bent over inwardly as shown in Fig. 6 (and Fig. 4) with the side plates 14 at the outside, the other end of the rubber band may be hooked over the rounded tongue 28 of the diagonal plate 18 by engagement in the neck 30 thereof and when the two opposite diagonal plates 18 and 20 are then brought together, covering and enclosing the rubber band between them, the tongue 28 is inserted in the slot 32 thus binding the two sections together.

Instead of having a tongue 24 at the center between the plates 12 and 14, the opposite edges at the fold line between the plates 12 and 14 may have a short cut or slot 36 terminate in the perforation to reduce tearing at the fold line. In this case, the rubber band instead of being hooked over a tongue 24 as shown in Fig. 3 will be seated in the slots 36 as shown in Fig. 4.

When the opposite portions of the display are thus connected by a tongue 28 and a slot 32, flaps of various shapes may be formed of the foldable end pieces 22 or they may be in the form of a right triangle as shown in Figs. 1–3 and also in Fig. 5, so that when pressure is applied to the opposite joined corners, between the sides 10 and 12 and 14 and 16, these sides will be flattened together as represented in Fig. 5 and if there are end pieces 22, they will fold over the flattened structure as shown in Fig. 5. In this condition, the diagonal plates are enclosed within and between the side plates 10—16 and the end pieces will be folded over or left extended depending upon the complete structure which is desired.

The pressure tending to expand or extend the display produced by the rubber band 34 is not sufficiently strong to press the sides outwardly if some slight restraint is provided and usually for a mailing piece, such restraint is provided by inserting the display in an ordinary envelope in which it fits closely. As soon as the envelope is opened, the elastic power element tends to distend the display and it will spring to open position as limited by the length of the diagonal plates 20 which form a cross piece upon which the other parts of the display are distended. If the end pieces 22 are all alike, they may fill up the ends forming a cube as in Figs. 1 and 2, but if they are omitted, a hollow figure is provided having a diagonal partition and open ends. By variously designing the end pieces 22, various different and attractive designs may be produced.

As shown in Fig. 6, a rounded tab 38 may be cut out of the material of one of the diagonal plates and extended outwardly instead of inwardly leaving a space for engagement of the other rounded tongue 28 so that the display will be properly held together. This tab 38 may be provided with a perforation 40 to afford means by which the display may be supported or suspended such as a Christmas tree ornament or a pendant display. The end pieces 22 may be supplied to close the display as indicated in Fig. 7 or they may be omitted and the side plates may be variously colored, figured, and some or all of the side plates may have perforations of various designs to make a composite attractive and decorative display.

Figure 9:
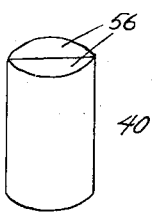

In Figs. 8 and 9, a circular display is provided by connecting two side plates 40 with two end plates 42 which form the diagonals when these end plates are turned inwardly against a center fold line 44 between the side plates curving the side plates oppositely outward to form a cylinder as shown in Fig. 9 and the end plates 42 forming diametric partitions for limiting the size of the center. To automatically collapse and hold this structure against the diagonals, a tongue 46 is cut out of one of the diagonals and slots 48 are formed at the opposite ends of the fold line 44 between the side plates 40 which are terminated by small circle openings 50 so that one portion of a rubber band 52 may be placed around the outside of the joined side plates 40 inserted in the slots 48 and seated in the openings 50 and the opposite portion may be engaged around the tongue 46.

When the end plates 42 are folded inwardly, the tongue 46 will project from the outside and may be seated in a slot 54 in the fold line between the opposite end plate 42 and its adjacent side plate 40 so that unless the display thus folded together is held in flattened position, the rubber band 52 will tend to cause the side plates to bulge outwardly in circular form limited by the width of the end plates 42 which form the diagonals. In this circular form, the end plates 42 may be provided with semi-circular flaps 56 at one or both ends which will close the respective portions of the cylinder. In this construction, either the rounded sides or the ends may be distinctively decorated provided with openings or ornamented thus providing a display of any desired form.

Figure 10:
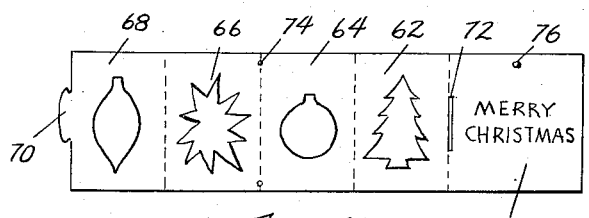
Fig. 10 shows a blank for producing an open ended display with cut out side openings as shown in Fig. 11.
Figure 11:
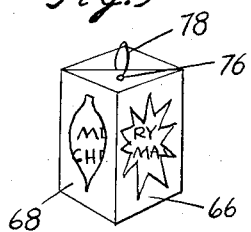

In some simple forms as shown by Figs. 10 and 11, only one diagonal plate 60 is required which has a hinge connection to four similar side plates 62, 64, 66 and 68 connected by scored fold lines. These plates may have similar or different figures printed thereon or cut therethrough, the latter when assembled with a colored or designed diagonal plate 60 showing various designs through the plates depending upon the cut-outs.

In this form, a tongue 70 is formed in the outer side plate 68 which is adapted to be inserted in a slot 72 between the diagonal plate 60 and its adjacent side plate 62 so that when a rubber band is inserted in end slots 74 between the two central side plates 64 and 66 and also engaging around the tongue 72, the display will be held in extended position, the diagonal limiting the extension of the device to display position. In this form of the device, perforations 76 may be made at one end of the diagonal plate 60 through which a small tape, ribbon or cord 78 may be inserted for supporting the display in a pendant position.

Figure 12:
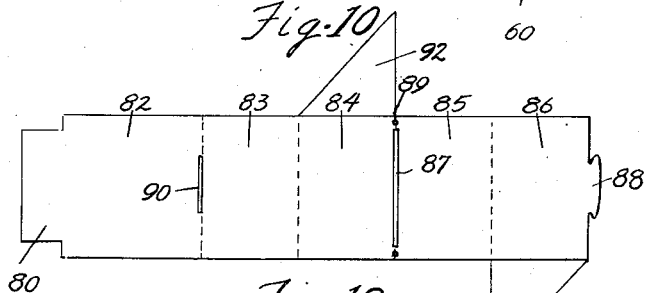
Fig. 12 shows a display blank for producing an open ended display with a projecting tongue as shown by Fig. 13.
Figure 13:
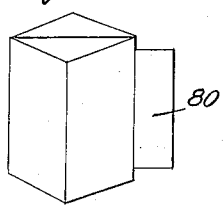

A rectangular structure having a projection 80 at one corner may be formed as shown in Figs. 12 and 13 from a single piece of material which is cut and scored to include a diagonal plate 82 and a succession of side plates 83, 84, 85 and 86. The side plates are foldable around the diagonal plate as in the form shown in Figs. 10 and 11, the projections 80 from the diagonal plate extending through a slot 87 between the central side plates 84 and 85 so that when the display is assembled, the projection 80 will extend angularly to the sides as shown in Fig. 13. The projection 80 may be used for additional copy area or illustration. In this case, an end tongue 88 is provided which engages one end of a rubber band, the opposite portion of the band being engaged in slots 89 at the ends of the fold line between the two side plates 84 and 85 and the tongue 88 is also inserted in a slot 90 between the diagonal plate 82 and its next connected side plate 83.

In this as well as in the other similar forms, the open ends may be closed at one or both ends of the structure by adding angular flaps 92 to the ends of some of the side plates as 84 and 86 and both ends of the display may be enclosed by adding similar angular tongues at the other ends of the side plates.

Figures 14, 15, 16:
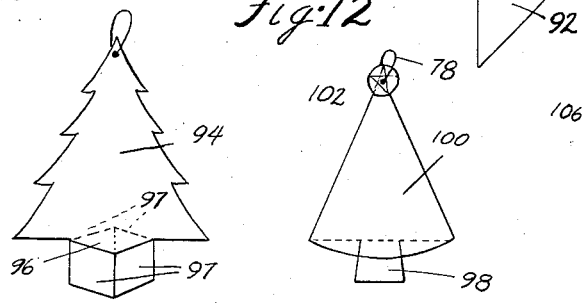
Fig. 14 shows a so-called Christmas tree display which is produced from a blank as shown in Fig. 13 by simply extending the end of one diagonal piece as represented in broken outline in Fig. 3.
Fig. 15 shows a display which may be produced similar to that shown in Fig. 14 by extending and changing the shape of the extending end of one of the diagonal supports.
Fig. 16 illustrates a variation of the square or rectangular display when extended to diamond shape.

Other display pieces such as a tree 94 may be produced by extending one of the diagonal plates 96 and connecting side plates 97 around it to form a base, as shown in Fig. 14. As shown in Fig. 15, a base 98 is an extension of the diagonal which supports a conical display 100 instead of a round one, as in Fig. 8, the diagonal also having a star 102 at the top.

By making a structure as shown in Figs. 10 and 11 with unequal adjacent sides 104 and 106 as shown in Fig. 16, having a diagonal plate 108, a diagonal shaped figure may be produced.

Figure 17:
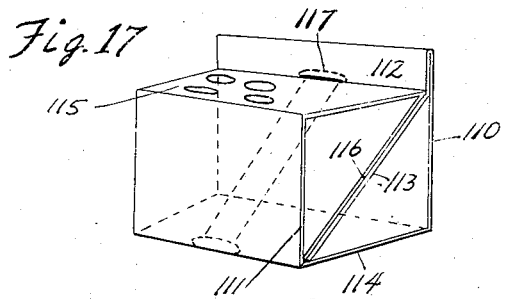
Fig. 17 represents a variation of the rectangle shown more particularly by Figs. 12 and 13 to present a display shape which may have a printed surface to make it resemble a side board, a desk, a gas stove or other of the display articles.

As shown in Fig. 17, one of the side plates 110 may be longer than the opposite side plate 111 with a reverse fold 112 hinging it to one diagonal 113. A bottom plate 114 is hinged to both sides 110 and 111 and a top plate 115 is hinged to a second diagonal 116 and a locking tongue 117 extending from the top plate 115 is inserted through suitable slots in the fold 112 and side plate 110 to lock the structure together and seat a rubber band as in Fig. 3. In this form, the display may be made to illustrate a stove or various articles of furniture.

In this manner, various different designs may be made of the same basic structure having a diagonal supporting piece which limits the extension of the connected side pieces outwardly from the plane of the diagonal plate, or plates if there are two of them. The variety of different designs which may be produced using the basic supporting structure is limited only by the ingenuity and artistic ability of a designer.

While a number of different displays have been shown and described in some detail, they should be regarded by way of illustrations and examples rather than restrictions or limitations of the invention as various changes may be made in the construction, combination and arrangement of the parts without departing from the spirit and scope of the invention.

I claim:

1. A distendable hollow display comprising flexible resilient sheet material, cut, scored and foldable to provide connected side plates and a diagonal plate, the side plates being of a combined length greater than twice that of the diagonal plate and extensible to opposite sides of the diagonal plate, the side plates when folded flatly against the diagonal plate extending from the side of the diagonal plate to which they are connected and beyond the opposite side thereof, and a resilient power member secured at one end to that side of the diagonal plate to which the side plates are connected, extending across the diagonal plate and connected at its other end at the joint between the side plates so that the side plates will be extended outward at each side of the diagonal plate when the power member extends the display, and the diagonal plate limits the extension of the side plates relative thereto when they are projected by the power member.

2. A distendable hollow display comprising flexible resilient sheet material, cut, scored and foldable to provide connected side plates and a diagonal plate connected at one end to a series of side plates, the side plates being of a combined length greater than twice that of the diagonal plate and extended around the diagonal plate with the remote edge of the side plates located at the end of the diagonal plate to which the side plates are connected, and a resilient power member connected at one end to that side of the diagonal plate to which the side plates are connected and extending across the diagonal plate to engage the side plates at a juncture of the two opposite connected side plates which are most remote from the edge of the diagonal plate to which the side plates are connected so that the display when folded flat with the resilient power member extended tends to cause the side plates to spring outwardly from the diagonal plate and the projection of the sides is limited in their extension by the length of the diagonal plate.

3. A display in accordance with claim 2, in which there is a diagonal plate at each end of the side plates, the diagonal plates being foldable over inwardly against the median fold between the connected side plates, the power member extending between the diagonal members when they are assembled to form an extensible display.

4. In a display in accordance with claim 2, the ends of at least one of the plates having projections therefrom which extend therefrom parallel to and bendable at right angles to each plate to which it is connected.

5. A hollow rectangular display in accordance with claim 2, in which the diagonal and other plates have flaps foldable at the ends and extensible when the display is distended to form a receptacle closed at the ends and extending from the ends parallel to the plates.

6. A rectangular display in accordance with claim 3, in which the diagonal plates have flaps foldable at the ends to provide a hollow receptacle closed at the top and bottom when the display is extended.

7. A display in accordance with claim 2, in which a tongue is provided at the outermost end of the side plates and a slot is provided in the foldable joint between the diagonal plate and the side plate joined thereto into which slot the said tongue is inserted for holding the display together both when it is in folded and extensible positions.

8. A display in accordance with claim 3, in which a tongue is provided at the joint between one diagonal plate and its adjacent side plate and a slot for receiving the tongue is provided between the opposite diagonal plate and its next adjacent side plate so that when the diagonal plates are placed together with the power member between them, the diagonal plates are locked together with the connected plates extending oppositely across and outside of the diagonal plates and beyond the opposite ends in the folded condition of the display.

9. In a display in accordance with claim 8, a projection formed at the junction of one of the diagonal plates with its side plate which projects beyond the tongue and slot connection between the side diagonals and forms a perforated tab by which the display may be suspended.

10. A display in accordance with claim 2, having a projection at one end of the diagonal plate adapted to extend beyond the end of the extensible structure and forming a projecting display of which the extensible structure is the base.

References Cited in the file of this patent

UNITED STATES PATENTS

| | | |
|---|---|---|
| 822,841 | Hill | June 5, 1906 |
| 990,154 | Mitchell | Apr. 18, 1911 |
| 1,684,244 | Richardson | Sept. 11, 1928 |
| 1,824,762 | Bloom | Sept. 29, 1931 |